United States Patent
Wang et al.

(10) Patent No.: US 12,553,374 B2
(45) Date of Patent: Feb. 17, 2026

(54) EXHAUST PIPE, METHOD FOR OPTIMIZING AND DESIGNING EXHAUST PIPE, AND ENGINE

(71) Applicant: WEICHAI POWER CO., LTD., Shandong (CN)

(72) Inventors: Xuepeng Wang, Shandong (CN); Wei Li, Shandong (CN); Jiaxun Shi, Shandong (CN); Junlong Liu, Shandong (CN); Fan Zeng, Shandong (CN); Lei Zhang, Shandong (CN); Guoxiang Li, Shandong (CN); Shuzhan Bai, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/904,778

(22) Filed: Oct. 2, 2024

(65) Prior Publication Data

US 2025/0122821 A1 Apr. 17, 2025

(30) Foreign Application Priority Data

Oct. 16, 2023 (CN) .......................... 202311329880.2

(51) Int. Cl.
| | |
|---|---|
| *F01N 13/10* | (2010.01) |
| *F02M 26/05* | (2016.01) |
| *F02M 26/09* | (2016.01) |
| *F02M 26/12* | (2016.01) |
| *F02M 26/14* | (2016.01) |

(52) U.S. Cl.
CPC ............. *F01N 13/10* (2013.01); *F02M 26/05* (2016.02); *F02M 26/09* (2016.02); *F02M 26/12* (2016.02); *F02M 26/14* (2016.02)

(58) Field of Classification Search
CPC ........ F01N 13/10; F02M 26/04; F02M 26/09; F02M 26/12; F02M 26/14
See application file for complete search history.

(56) References Cited

FOREIGN PATENT DOCUMENTS

| | | | | |
|---|---|---|---|---|
| CN | 109738197 A | * | 5/2019 | |
| CN | 215256430 U | * | 12/2021 | |
| CN | 115234350 A | * | 10/2022 | ............. F01N 13/08 |
| CN | 116150894 A | * | 5/2023 | |
| WO | WO-2016195573 A1 | * | 12/2016 | ............. F01N 13/10 |

* cited by examiner

*Primary Examiner* — Audrey B. Walter
(74) *Attorney, Agent, or Firm* — Scully, Scott, Murphy & Presser, P.C.

(57) ABSTRACT

An exhaust pipe, a method for optimizing and designing an exhaust pipe, and an engine are provided. The exhaust pipe includes a first exhaust pipeline arranged in a first direction, an EGR pipeline arranged in a second direction, and a pre-turbine pipeline arranged in a third direction. An input end of the EGR pipeline is communicated with an output end of the first exhaust pipeline, and an included angle $\theta_1$ between the first direction and the second direction is smaller than 60°. The pre-turbine pipeline, the EGR pipeline and the first exhaust pipeline are located in a first plane; the pre-turbine pipeline is communicated with the EGR pipeline, an included angle $\theta_2$ between the third direction and the second direction is smaller than or equal to 90°, and a cross-sectional diameter D of the pre-turbine pipeline is 0.2-1 times the diameter of the first exhaust pipeline.

7 Claims, 7 Drawing Sheets

EXHAUST PIPE, METHOD FOR OPTIMIZING AND DESIGNING EXHAUST PIPE, AND ENGINE

TECHNICAL FIELD

The present disclosure relates to the technical field of engine exhaust, and specifically relates to an exhaust pipe, a method for optimizing and designing an exhaust pipe, and an engine.

BACKGROUND

In order to alleviate energy crisis and environmental pollution, the reduction of gas consumption and emission is currently an urgent problem that needs to be solved for natural gas engines, and improving a thermal efficiency is a necessary path to gas consumption reduction. Improving EGR rate can lower an in-cylinder temperature, suppress knocking, and is of great significance for improving the thermal efficiency.

Figure 1:
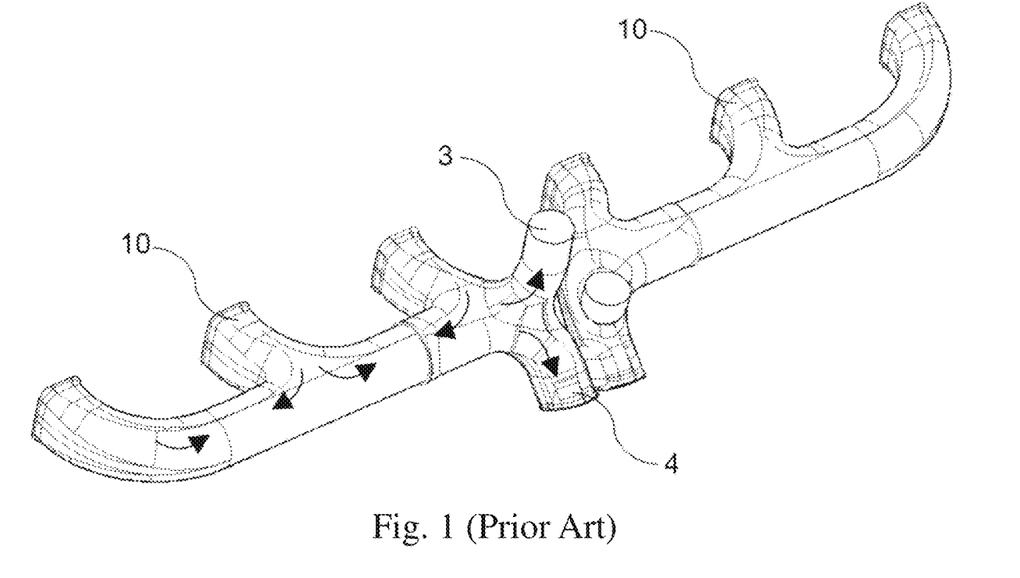
FIG. 1 is a schematic structural diagram of an exhaust pipe of an existing engine.

Traditional natural gas engines mostly use a vortex intake system, which has a low tolerance for EGR and does not require a very high EGR rate. Therefore, the exhaust pipe design concept of traditional natural gas engines prioritizes ensuring a pre-turbine flow rate. As shown in FIG. 1, in the existing engine exhaust pipes, a main pipeline of the exhaust pipe is mostly a straight section, and the main pipeline is mostly communicated with a pre-turbine pipeline and an EGR pipeline at right angles.

However, since heavy-duty natural gas engines of roof systems have a higher tolerance for EGR, a higher EGR rate can be used to suppress knocking and improve the thermal efficiency. However, when the above exhaust pipe structure is used, due to the unreasonable design of the communication structure between the EGR pipeline and the main pipeline of the exhaust pipe, exhaust gas of some engine cylinders cannot be smoothly directed to an inlet of the EGR pipeline, resulting in a weak gas extraction ability of the EGR pipeline and a low EGR rate, which cannot meet the high EGR rate requirement of heavy-duty natural gas engines of the roof systems. In addition, since the main pipeline of the exhaust pipe is a straight section, there is no good guidance on the exhaust pipeline from a cylinder outlet to a pre-turbine inlet. The exhaust gas of each cylinder will interfere with each other in the main pipe of the exhaust pipe, and the exhaust pulses cannot be well utilized. Moreover, the main pipeline is mostly communicated with the pre-turbine pipeline and the EGR pipeline at right angles, which can easily lead to high pipeline pressure loss, concentrated thermal stress at pipeline bends, and poor reliability.

SUMMARY

An object of the present disclosure is to at least solve the problem that the existing exhaust pipe structures cannot meet the requirement for high EGR rate. This object is achieved through the following technical solutions.

A first aspect of the present disclosure proposes an exhaust pipe, which includes:
  a first exhaust pipeline, which is arranged in a first direction;
  an EGR pipeline, which is arranged in a second direction, and an input end of which is communicated with an output end of the first exhaust pipeline, an included angle $\theta_1$ between the first direction and the second direction being smaller than 60°; and
  a pre-turbine pipeline, in which the pre-turbine pipeline, the EGR pipeline and the first exhaust pipeline are located in a first plane, and the pre-turbine pipeline is arranged in a third direction; the pre-turbine pipeline is communicated with the EGR pipeline, an included angle $\theta_2$ between the third direction and the second direction is smaller than or equal to 90°, and a cross-sectional diameter D of the pre-turbine pipeline is 0.2-1 times the diameter of the first exhaust pipeline.

The exhaust pipe of the present disclosure includes the first exhaust pipeline, the EGR pipeline, and the pre-turbine pipeline. By communicating the input end of the EGR pipeline with the output end of the first exhaust pipeline, and communicating the pre-turbine pipeline with a middle part of the EGR pipeline, the exhaust gas of the cylinder is prioritized into the EGR pipeline, making the gas extraction of EGR smoother. At the same time, the included angle between the first direction and the second direction, the included angle between the third direction and the second direction, and the cross-sectional diameter of the EGR pipeline are defined, which can not only ensure that the exhaust pipe has a high EGR rate, but also can make full use of exhaust pulses. The allocation of pre-turbine flow rate and EGR rate is more reasonable, thus meeting the requirements of different-purpose engines for pre-turbine flow rate and EGR rate.

In addition, the exhaust pipe according to the present disclosure may also have the following additional technical features.

In some embodiments of the present disclosure, the exhaust pipe further includes:
  second exhaust pipelines, in which there are multiple second exhaust pipelines provided, and output ends of the multiple second exhaust pipelines are all communicated with the pre-turbine pipeline.

In some embodiments of the present disclosure, the exhaust pipe further includes:
  a transmission pipeline, in which all the second exhaust pipelines are communicated with the transmission pipeline, an output end of the transmission pipeline is communicated with the pre-turbine pipeline, and the connection between the transmission pipeline and the pre-turbine pipeline is transitioned using a circular arc.

In some embodiments of the present disclosure, the value of the radius R of the circular arc is in a range of 10 mm≤R≤50 mm.

In some embodiments of the present disclosure, all the second exhaust pipelines and the first exhaust pipeline are arranged side by side in a fourth direction, and the fourth direction is perpendicular to the first plane.

In some embodiments of the present disclosure, all the connections between the second exhaust pipelines and the transmission pipeline are transitioned using circular arcs.

In some embodiments of the present disclosure, all the second exhaust pipelines are arranged adjacent to each other, and the output ends of all the second exhaust pipelines are communicated with each other.

A second aspect of the present disclosure also proposes a method for optimizing and designing an exhaust pipe, which is used for manufacturing the exhaust pipe of the present disclosure, and the method for optimizing and designing the exhaust pipe includes:
  constructing an optimization and simulation model of the exhaust pipe based on an engine model;

performing simulation calculation based on the optimization and simulation model to obtain a pre-turbine flow rate and an EGR flow rate;

adjusting the included angle $\theta_1$ between the first direction and the second direction as well as the included angle $\theta_2$ between the third direction and the second direction if the EGR flow rate does not meet the requirement of the engine model; and adjusting the cross-sectional diameter D of the pre-turbine pipeline if the pre-turbine flow rate does not meet the requirement of the engine model.

The method for optimizing and designing the exhaust pipe according to the present disclosure can quickly select and optimize the allocation of pre-turbine flow rate and EGR flow rate through simulation, reducing the testing cycle and cost. By adjusting the included angle $\theta_1$ between the first direction and the second direction, the included angle $\theta_2$ between the third direction and the second direction, and the cross-sectional diameter D of the pre-turbine pipeline, the required allocation of EGR flow rate and pre-turbine flow rate can be obtained, thereby meeting the requirements of different-purpose engines for pre-turbine flow rate and EGR rate.

In some embodiments of the present disclosure, before constructing the optimization and simulation model of the exhaust pipe based on the engine model, the method includes:

installing a standard exhaust pipe in a test bench for testing and obtaining first adjustment parameters, which include the pre-turbine flow rate and EGR flow rate of the standard exhaust pipe under specified operating conditions;

constructing a simulation model of the standard exhaust pipe using simulation software;

performing simulation calculation based on the simulation model and obtaining second adjustment parameters, which include the pre-turbine flow rate and the EGR flow rate; and setting the grids and parameters in the simulation model as calculation data if the differences between the second adjustment parameters and the first adjustment parameters meet test requirements.

A third aspect of the present disclosure also proposes an engine, which includes the exhaust pipe according to the present disclosure.

Compared to the prior art, the engine proposed in the present disclosure has the technical advantages of the exhaust pipe described above, which will not be described repeatedly herein.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present disclosure. Moreover, throughout the drawings, the same reference signs are used to denote the same components. In the drawings.

LIST OF REFERENCE SIGNS

10: exhaust pipe;
1: first exhaust pipeline;
2: second exhaust pipeline;
3: EGR pipeline; 31: gas extraction part; 32: transmission part;
4: pre-turbine pipeline;
5: transmission pipeline.

DETAILED DESCRIPTION

Hereinafter, exemplary embodiments of the present disclosure will be described in greater detail with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive, and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "above", "over", etc. These spatial relative terms are intended to include different orientations of the device in use or in operation in addition to the orientation depicted in the drawings. For example, if the device in the figure is turned over, then elements described as "below other elements or features" or "under other elements or features" will be oriented "above the other elements or features" or "over the other elements or features". Thus, the exemplary term "below" may include orientations of both above and below. The device can be otherwise oriented (rotated by 90 degrees or in other directions), and the spatial relationship descriptors used herein will be explained accordingly.

The present disclosure relates to an exhaust pipe 10, which mainly includes a first exhaust pipeline 1, an EGR pipeline 3, and a pre-turbine pipeline 4.

The first exhaust pipeline 1 is arranged in a first direction a. The EGR pipeline 3 is arranged in a second direction b, and an input end of the EGR pipeline 3 is communicated with an output end of the first exhaust pipeline 1. An included angle $\theta_1$ between the first direction a and the second direction b is smaller than 60°. The pre-turbine pipeline 4, the EGR pipeline 3 and the first exhaust pipeline 1 are located in a first plane, and the pre-turbine pipeline 4 is arranged in a third direction c; the pre-turbine pipeline 4 is communicated with a middle part of the EGR pipeline 3, an included angle $\theta_2$ between the third direction c and the second direction b is smaller than or equal to 90°, and a cross-sectional diameter D of the pre-turbine pipeline 4 is 0.2-1 times the diameter of the first exhaust pipeline 1.

Figure 2:
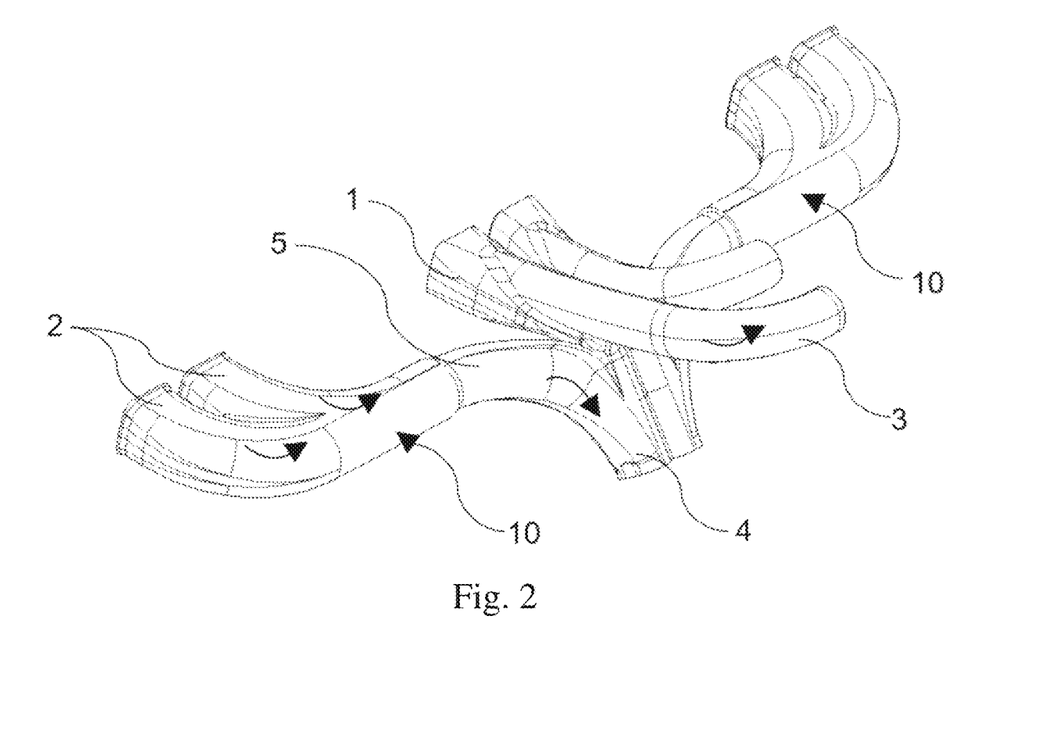
FIG. 2 is a schematic structural diagram of two sets of exhaust pipes shown in an embodiment of the present disclosure.

In the exhaust pipe 10 of this embodiment, by communicating the input end of the EGR pipeline 3 with the output end of the first exhaust pipeline 1, and communicating the pre-turbine pipeline 4 with the middle part of the EGR pipeline 3, the exhaust gas of the cylinder is prioritized into the EGR pipeline, making the gas extraction of EGR smoother. At the same time, the included angle $\theta_1$ between the first direction a and the second direction b, the included angle $\theta_2$ between the third direction c and the second direction b, and the cross-sectional diameter D of the EGR pipeline 3 are defined, which can not only ensure that the exhaust pipe 10 has a high EGR rate, but also can make full use of exhaust pulses. The allocation of pre-turbine flow rate and EGR rate is more reasonable, thus meeting the requirements of different-purpose engines for pre-turbine flow rate and EGR rate Based on the overall design concept described above, an exemplary structure of the exhaust pipe 10 of this embodiment is shown in FIGS. 1 and 2, and at this time, the exhaust pipe 10 will be described specifically in this embodiment by using a six-cylinder engine as an example. However, in addition to the six-cylinder engine, the engine of this embodiment can of course also be another type of engine. When other types of engines are used, for the specific design of the exhaust pipe 10 and its arrangement in the engine, reference can be made to the following description of this embodiment.

Specifically, the exhaust pipe 10 includes a first exhaust pipeline 1, an EGR pipeline 3, a pre-turbine pipeline 4, a second exhaust pipeline 2, and a transmission pipeline 5. An output end of the first exhaust pipeline 1 is communicated with an input end of the EGR pipeline 3, and the pre-turbine pipeline 4 is communicated with a middle part of the EGR pipeline 3. An output end of the second exhaust pipeline 2 is communicated with the transmission pipeline 5, and an output end of the transmission pipeline 5 is communicated with the pre-turbine pipeline 4, that is, the second exhaust pipeline 2 is communicated with the pre-turbine pipeline 4 through the transmission pipeline 5. At this time, as shown in FIG. 2, a portion of the gas discharged from the cylinders of the engine enters the second exhaust pipeline 2, and then directly enters the turbine. The other portion of the gas discharged from the cylinders of the engine enters the first exhaust pipeline 1, and then preferentially enters the EGR pipeline 3. Then, the portion of the gas that enters the EGR pipeline 3 enters the turbine through the pre-turbine pipeline 4. Such an arrangement helps to balance the allocation of pre-turbine flow rate and EGR flow rate, and avoids mutual interference between the exhaust gas of the cylinders, so that the problem that the exhaust pulses cannot be well utilized is solved.

Figure 4:
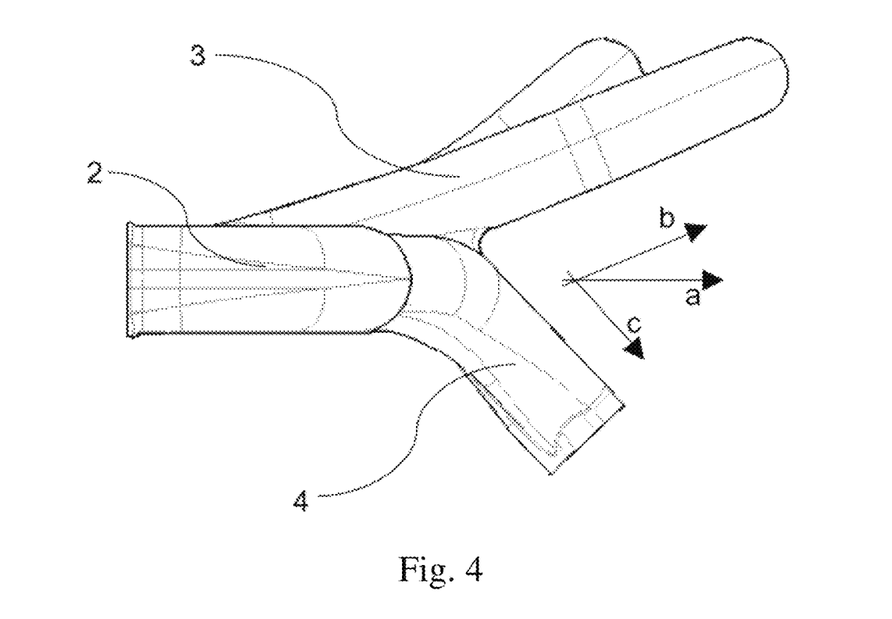
FIG. 4 is a schematic structural diagram of two sets of exhaust pipes shown in the embodiment of the present disclosure from another perspective.

As shown in FIGS. 1 and 4, the first exhaust pipeline 1, the EGR pipeline 3, and the pre-turbine pipeline 4 are all located in the first plane. The first exhaust pipeline 1 is arranged in the first direction a, the EGR pipeline 3 is arranged in the second direction b, and the pre-turbine pipeline 4 is arranged in the third direction c. The included angle $\theta_1$ between the first direction a and the second direction b is smaller than 60°. The included angle $\theta_2$ between the third direction c and the second direction b is smaller than or equal to 90°. The value of the included angle $\theta_1$ between the first direction a and the second direction b can be 10°, 20°, 30°, 40°, 45°, and 50°, and the value of the included angle $\theta_2$ between the third direction c and the second direction b can be 10°, 30°, 45°, 60°, and 90°. Preferably, in this embodiment, the value of the included angle $\theta_1$ between the first direction a and the second direction b is selected as 30°, and the value of the included angle $\theta_2$ between the third direction c and the second direction b is selected as 60°.

At the same time, the output end of the first exhaust pipeline 1 is communicated with the input end of the EGR pipeline 3, and the input end of the pre-turbine pipeline 4 is communicated with the middle part of the EGR pipeline 3. Defining the included angle $\theta_1$ between the first direction a and the second direction b helps to ensure that there is sufficient gas in the first exhaust pipeline 1 that flows to the EGR pipeline 3, thereby ensuring the EGR rate of the exhaust pipe 10. Defining the included angle $\theta_2$ between the third direction c and the second direction b can constrain the flow rate of gas from the first exhaust pipeline 1 to the pre-turbine pipeline 4. At this time, the exhaust pipe 10 can balance the allocation of pre-turbine flow rate and EGR flow rate, and solve the problem of difficult EGR gas extraction.

At this time, a cross-sectional diameter of the pre-turbine pipeline 4 is D, and the cross-sectional diameter D of the pre-turbine pipeline 4 is 0.2-1 times the diameter of the first exhaust pipeline 1. By defining the cross-sectional diameter D of the pre-turbine pipeline 4 and in cooperation with the included angle $\theta_2$ between the third direction c and the second direction b, the pre-turbine flow rate can be adjusted to meet the engine's demand for the pre-turbine flow rate. At the same time, in further cooperation with the included angle $\theta_1$ between the first direction a and the second direction b, the allocation of pre-turbine flow rate and EGR flow rate can be adjusted, thereby further improving the applicability of the exhaust pipe 10 to different engine models.

Herein, it should be noted that in this embodiment, the EGR pipeline 3 includes a gas extraction part 31 and a transmission part 32, the gas extraction part 31 is communicated with the first exhaust pipeline 1, and the transmission part 32 is communicated with the gas extraction part 31. By providing the EGR pipeline 3 with the gas extraction part 31 and the transmission part 32, not only can it be used in cooperation with the first exhaust pipeline 1 and the pre-turbine pipeline 4 described above, but also it helps to ensure that the exhaust pipe 10 has better assembly space, which can be better suitable for the assembly of the exhaust pipe 10 on the engine and improve the space utilization rate. As a preferred embodiment, the input end of the pre-turbine pipeline 4 is communicated with the gas extraction part 31, and at this time, an axial length of the gas extraction part 31 is relatively small to ensure the allocation of pre-turbine flow rate and EGR flow rate. At the same time, the axial direction of the transmission part 32 is set at an angle to the axial direction of the gas extraction part 31 so that the exhaust pipe 10 can be suitable for various engine models. Preferably, the orientation of the transmission part 32 is the same as the following fourth direction d.

Figure 3:
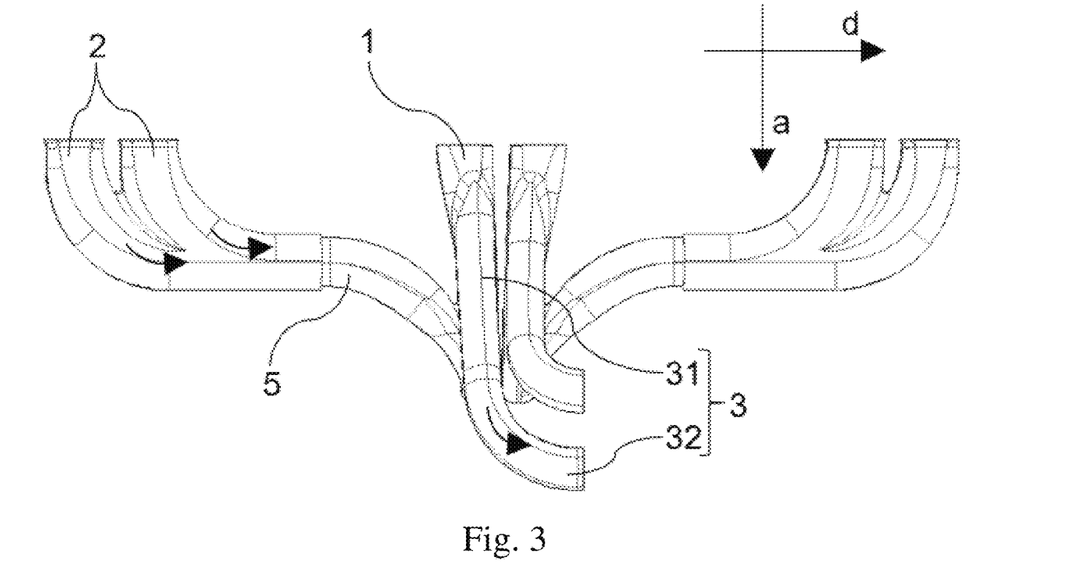
FIG. 3 is a schematic structural diagram of two sets of exhaust pipes shown in the embodiment of the present disclosure from a certain perspective.

As shown in FIG. 3, there are multiple second exhaust pipelines 2, and the multiple second exhaust pipelines 2 and the first exhaust pipeline 1 are all communicated with gas output ends of the cylinders of the engine. In this embodiment, the number of the second exhaust pipelines 2 is two, and every two second exhaust pipelines 2 and one first exhaust pipeline 1 form a group, and each six-cylinder engine uses two sets of exhaust pipes 10. For ease of description, one of the two sets of exhaust pipes 10 is referred to as the first exhaust pipe 10, and the other of the two sets of exhaust pipes 10 is referred to as the second exhaust pipe 10. At this time, the two second exhaust pipelines 2 in the first exhaust pipe 10 are communicated with a first cylinder and a second cylinder of the engine respectively, and the first exhaust pipeline 1 is communicated with a third cylinder of the engine; correspondingly, the first exhaust pipeline 1 is communicated with a fourth cylinder of the engine, and the two second exhaust pipelines 2 in the first exhaust pipe 10 are communicated with a fifth cylinder and a sixth cylinder of the engine respectively. At this time, the exhaust gas of the third cylinder and the fourth cylinder preferentially enters the EGR pipeline 3, and then part of the gas enters the turbine through the pre-turbine pipeline 4. Through such an arrangement, the first cylinder, the second cylinder, the fifth cylinder and the sixth cylinder are directly communicated with the pre-turbine pipeline 4, and the third cylinder and the fourth cylinder are communicated with the pre-turbine pipeline 4 through the EGR pipeline 3, which helps to solve the problem of exhaust interference between the existing exhaust pipes 10, and also can solve the problem of difficult EGR gas extraction in the existing exhaust pipes 10.

At this time, all the second exhaust pipelines 2 are arranged in the first direction a, the transmission pipeline 5 is arranged in the fourth direction d, and the first direction a is arranged perpendicular to the fourth direction d. In this embodiment, the first exhaust pipeline 1 and the two second exhaust pipelines 2 are arranged side by side in the fourth direction d, and the first exhaust pipe 10 and the second exhaust pipe 10 are arranged side by side in the fourth direction d. The fourth direction d is perpendicular to the first direction a, and at the same time, the fourth direction d is perpendicular to the third direction c and the second direction b. The first exhaust pipeline 1 in the first exhaust pipe 10 is arranged adjacent to the first exhaust pipeline 1 in the second exhaust pipe 10. Preferably, the first exhaust pipeline 1 in the first exhaust pipe 10 abuts against the first exhaust pipeline 1 in the second exhaust pipe 10. At this time, the pre-turbine pipeline 4 in the first exhaust pipe 10 abuts against the pre-turbine pipeline 4 in the second exhaust pipe 10. Of course, the first exhaust pipe 10 and the second exhaust pipe 10 can be fixedly connected by welding or other means to improve the reliability between the first exhaust pipe 10 and the second exhaust pipe 10.

As shown in FIG. 4, all the connections between the second exhaust pipelines 2 and the transmission pipeline 5 are transitioned using circular arcs. When using a right-angle turning structure for changing the direction of pipeline, there is significant pressure loss in the pipeline, and thermal stress concentration is prone to occurrence at the turning point of pipeline, resulting in poor reliability of the pipeline. In order to improve the reliability of the pipeline, in this embodiment, the connections between the two second exhaust pipelines 2 and the transmission pipeline 5 are both transitioned using circular arcs. The radius of the transition circle can be the same as or different from the radius R of the following circular arc. Using the circular arc transition for the communication between the second exhaust pipelines 2 and the transmission pipeline 5 helps to guide the exhaust gas of the cylinders of the engine, reduce exhaust interference, and improve the utilization rate of exhaust pulses.

At this time, all the second exhaust pipelines 2 are arranged adjacent to each other, and the output ends of all the second exhaust pipelines 2 are communicated with each other. Still as shown in FIG. 3, two second exhaust pipelines 2 are arranged adjacent to each other to achieve a common-flange design, which helps to improve the reliability of the exhaust pipe 10. The output ends of the two second exhaust pipelines 2 are communicated with each other. Since the connections between the two second exhaust pipelines 2 and the transmission pipeline 5 are both transitioned using circular arcs, this arrangement causes the gas in the two second exhaust pipelines 2 to exhibit a motion pattern of first gathering and then entering the transmission pipeline 5. At this time, the pipeline structure between the output ends of the two second exhaust pipelines 2 and the transmission pipeline 5 is a tapering transition structure, which helps to increase the flow velocity of gas in the transmission pipeline 5 and thus achieve the effect of increasing exhaust pulses.

Figure 5:
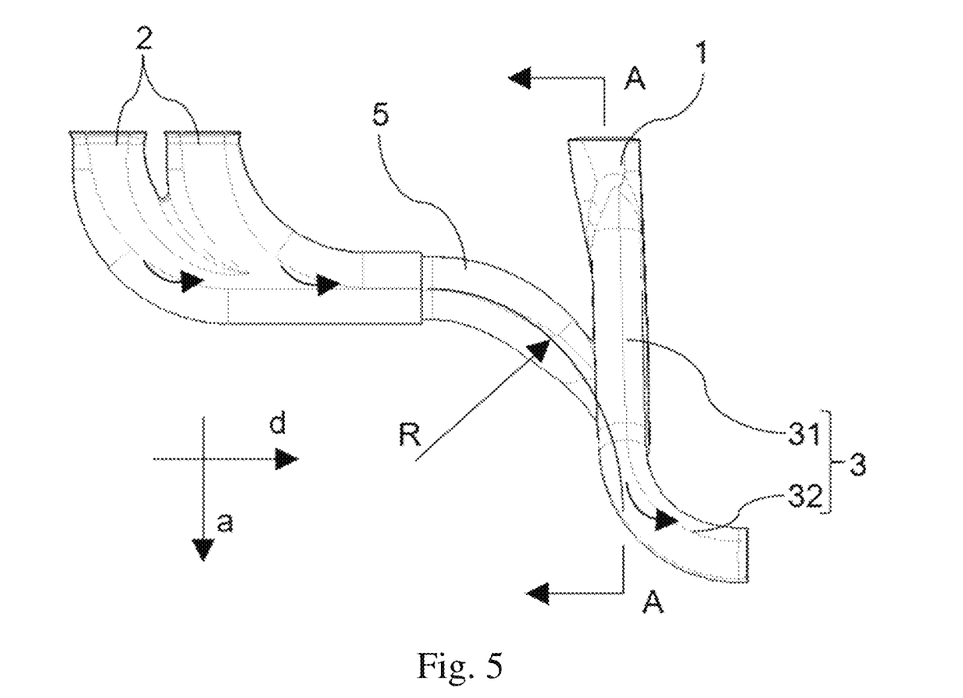
FIG. 5 is a schematic structural diagram of the exhaust pipe shown in the embodiment of the present disclosure.
Figure 6:
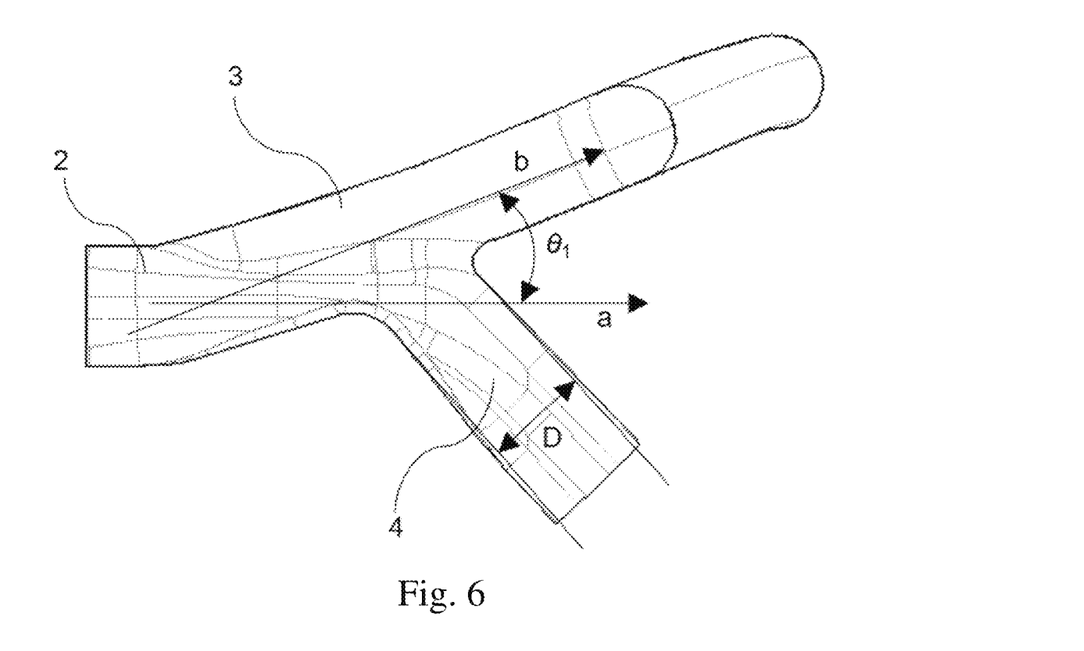
FIG. 6 is a schematic partial cross-sectional view taken along line A-A in FIG. 5.
Figure 7:
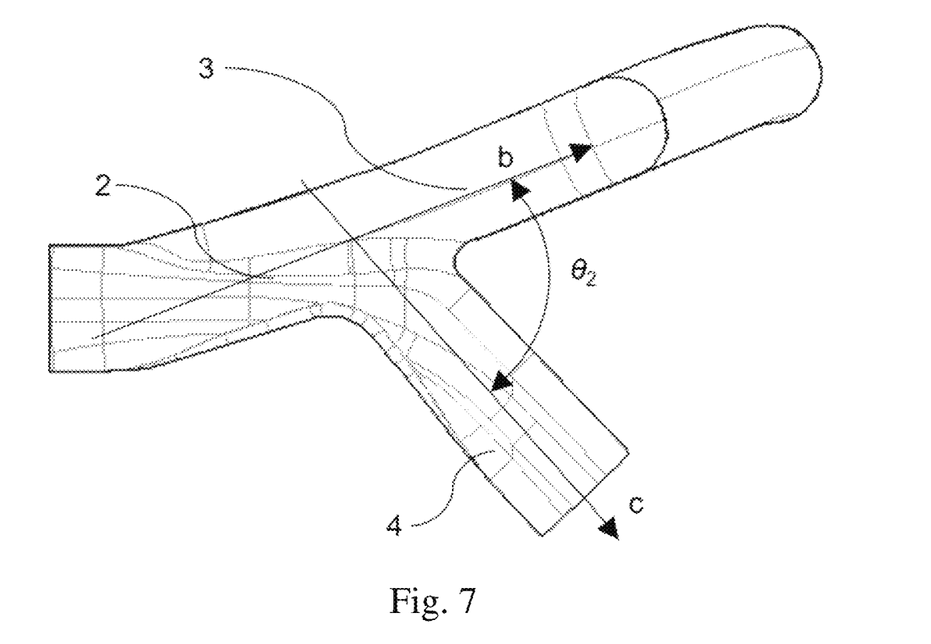
FIG. 7 is a schematic partial cross-sectional view taken along line A-A in FIG. 5.

In this embodiment, the output end of the transmission pipeline 5 is communicated with the middle part of the pre-turbine pipeline 4, and the connection between the transmission pipeline 5 and the pre-turbine pipeline 4 is transitioned using a circular arc. As shown in FIG. 5, the output end of the transmission pipeline 5 is communicated with the middle part of the pre-turbine pipeline 4. At the same time, in order to further improve the guidance of gas flow by the transmission pipeline 5, the orientation of the output end of the transmission pipeline 5 is the same as the arrangement direction of the pre-turbine pipeline 4. This arrangement helps to further reduce exhaust interference and ensure the output effect of the transmission pipeline 5. As a preferred embodiment, the radius R of the arc at the connection between the transmission pipeline 5 and the pre-turbine pipeline 4 is in a range of 10 mm≤R≤50 mm. Defining the radius R of the arc helps to improve the utilization rate of exhaust pulses by the exhaust pipe 10.

Specifically, when the radius R of the arc increases, the exhaust pulses become more fully utilized. Preferably, the radius R of the circular arc in this embodiment is 10 mm, 20 mm, 30 mm, 40 mm, 45 mm, and 50 mm. When the radius R of the arc is 30 mm, the utilization effect of exhaust pulse is the best.

At this time, as a preferred embodiment, an inner diameter of the transmission pipeline 5 gradually decreases from the input end to the output end. Defining the inner diameter of the transmission pipeline 5 helps to further increase the flow velocity of gas in the transmission pipeline 5 and further increase the utilization rate of exhaust pulses.

In addition, it should also be noted that during specific preparation of the exhaust pipe 10, it is preferred to use an integrated molding process for manufacturing. Meanwhile, the first exhaust pipe 10 and the second exhaust pipe 10 of the engine in this embodiment can be manufactured through the integrated molding process. Of course, in addition to integrated molding, the first exhaust pipe 10 and the second exhaust pipe 10 can be manufactured separately.

The overall arrangement of the exhaust pipe 10 of the present disclosure is compact, which can utilize the exhaust pulses more fully and achieve a reasonable allocation of pre-turbine flow rate and EGR rate, helping to achieve a better EGR rate. At the same time, the efficiency of the turbocharger can also be effectively improved, making the tendency for knocking become smaller; the ignition advance angle can be more forward, and the thermal efficiency can be higher.

This embodiment also relates to a method for manufacturing an exhaust pipe 10, which is used for manufacturing the exhaust pipe 10 described above. Specifically, the method for manufacturing the exhaust pipe 10 includes:

constructing an optimization and simulation model of the exhaust pipe 10 based on an engine model;

performing simulation calculation based on the optimization and simulation model to obtain a pre-turbine flow rate and an EGR flow rate;

adjusting the included angle $\theta_1$ between the first direction a and the second direction b as well as the included angle $\theta_2$ between the third direction c and the second direction b if the EGR flow rate does not meet the requirement of the engine model; and adjusting the cross-sectional diameter D of the pre-turbine pipeline 4 if the EGR flow rate does not meet the requirement of the engine model.

The method for manufacturing the exhaust pipe 10 according to the present disclosure can quickly select and optimize the allocation of pre-turbine flow rate and EGR flow rate through simulation, reducing the testing cycle and cost. By adjusting the included angle $\theta_1$ between the first direction a and the second direction b, the included angle $\theta_2$ between the third direction c and the second direction b, and the cross-sectional diameter D of the pre-turbine pipeline 4, the required allocation of EGR flow rate and pre-turbine flow rate can be obtained, thereby meeting the requirements of different-purpose engines for pre-turbine flow rate and EGR rate.

As a preferred embodiment, before constructing the optimization and simulation model of the exhaust pipe 10 based on the engine model, the method includes:

installing a standard exhaust pipe 10 in a test bench for testing and obtaining first adjustment parameters, which include the pre-turbine flow rate and EGR flow rate of the standard exhaust pipe 10 under specified operating conditions;

constructing a simulation model of the standard exhaust pipe 10 using simulation software;

performing simulation calculation based on the simulation model and obtaining second adjustment parameters, which include the pre-turbine flow rate and the EGR flow rate; and setting the grids and parameters in the simulation model as calculation data if the differences between the second adjustment parameters and the first adjustment parameters meet test requirements.

Figure 8:
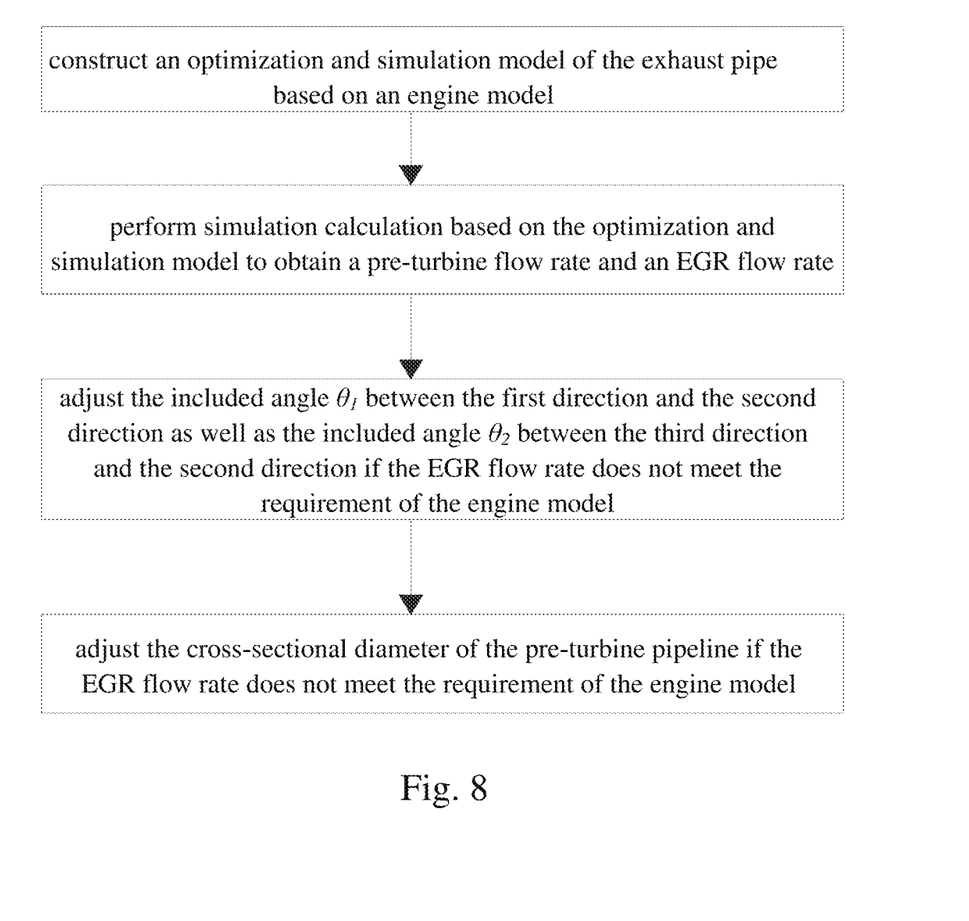
FIG. 8 is a schematic flowchart of the method for optimizing and designing an exhaust pipe shown in an embodiment of the present disclosure.

As shown in FIG. 8, in the actual manufacturing process, first, one exhaust pipe 10 is taken as the standard exhaust pipe 10, and the standard exhaust pipe 10 is installed on the test bench to obtain the first adjustment parameters through testing. The first adjustment parameters include the pre-turbine flow rate and EGR flow rate of the standard exhaust pipe 10 under specified operating conditions. Then, based on the size of the standard exhaust pipe 10, a modular simulation model of the exhaust pipe 10 is built. After constructing the simulation model of the standard exhaust pipe 10 using simulation software, simulation calculations are performed based on this simulation model to obtain the second adjustment parameters, which include the pre-turbine flow rate and the EGR flow rate. Then results of the same tests are benchmarked. If the calibration error exceeds a matching range, the parameter settings and grids of the simulation model will be adjusted. If the differences between the second adjustment parameters and the first adjustment parameters meet test requirements, the grids and parameters in the simulation model are set as calculation data (specification). At this time, the calculation data (specification) is applicable to the subsequent simulation and model selection of exhaust pipes 10 of other models.

Next, based on this specification and according to the requirements of the required engine model, an optimization and simulation model of the exhaust pipe 10 is constructed. Then, based on the optimization and simulation model, simulation calculations are performed to obtain the pre-turbine flow rate and EGR flow rate. Finally, based on the calculated EGR flow rate and pre-turbine flow rate, it is judged whether the optimization and simulation model of the exhaust pipe 10 meets the requirements of the engine model.

In the specific judgment process, if the streamline in front of the turbine is not smooth enough, the radius R of the circular arc at the connection between the transmission pipeline and the pre-turbine pipeline 4 is adjusted, and simulation evaluation is performed again. If the optimization and simulation model of the exhaust pipe 10 does not meet the requirement of the engine model for the required EGR flow rate, the included angle $\theta_1$ between the first direction a and the second direction b as well as the included angle $\theta_2$ between the third direction c and the second direction b are adjusted, and simulation evaluation is performed again. If the optimization and simulation model of the exhaust pipe 10 does not meet the requirement of the engine model for the required pre-turbine flow rate, the cross-sectional diameter D of the pre-turbine pipeline 4 is adjusted until the requirement is met.

Finally, based on the optimization and simulation model of the exhaust pipe 10 that meets the requirements, specific parameters of the exhaust pipe 10 are obtained, and the manufacturing of the exhaust pipe 10 is carried out according to the specific parameters of the exhaust pipe 10. Matching and selecting the exhaust pipe 10 through simulation calculation results in shorter time and lower cost compared to test selecting.

The overall arrangement of the exhaust pipe 10 of the present disclosure is compact, and for different-purpose models, it is only required to adjust key parameters for the exhaust pipe 10. The modification of key parameters can make the exhaust pulses more fully utilized, and achieve a reasonable allocation of pre-turbine flow rate and EGR rate, resulting in a higher EGR rate. The efficiency of the turbocharger is effectively improved, making the tendency for knocking become smaller; the ignition advance angle can be more forward, and the thermal efficiency can be higher.

Figure 9:
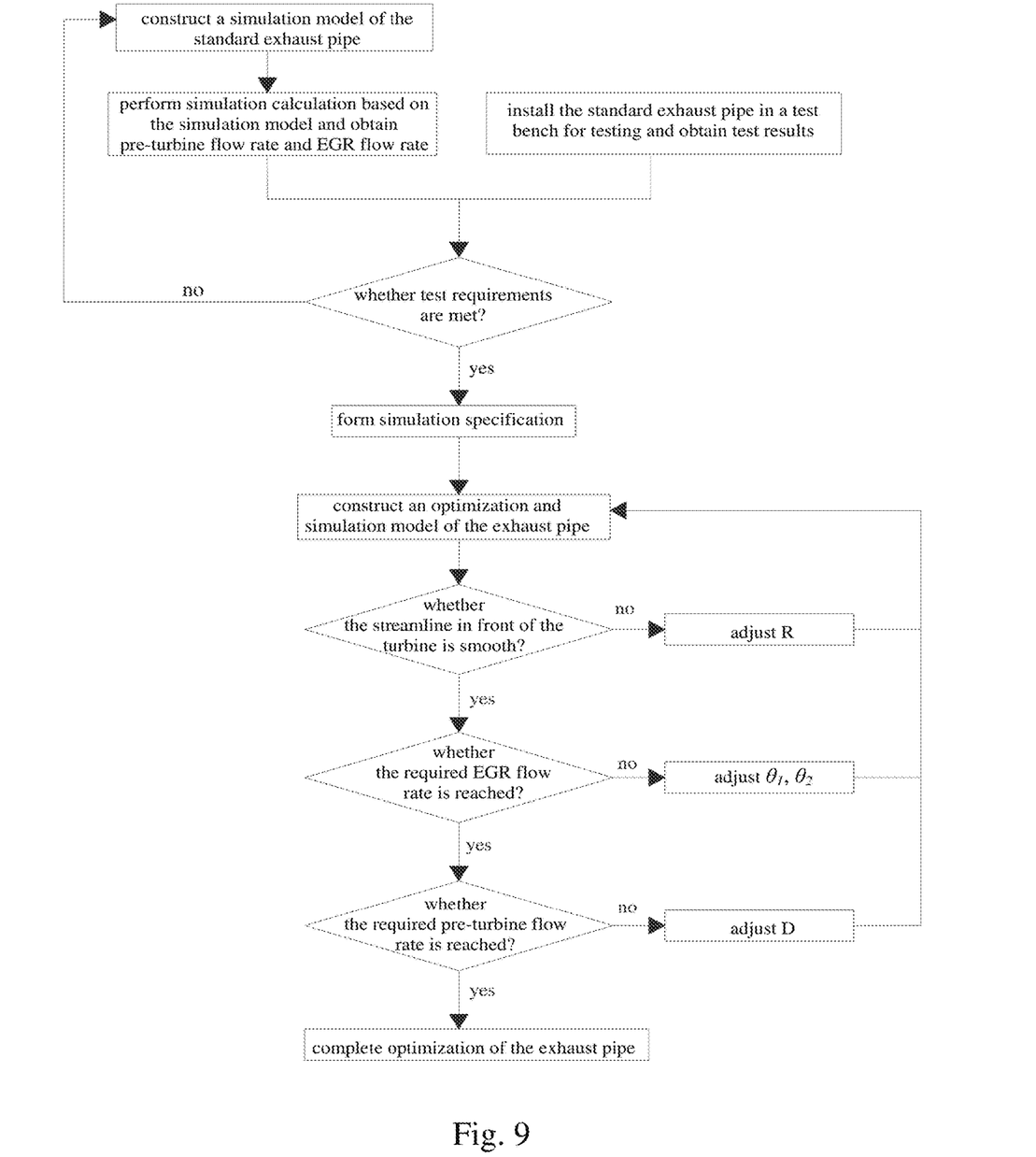
FIG. 9 is a schematic logical diagram of the method for optimizing and designing an exhaust pipe shown in the embodiment of the present disclosure.
Figure 10:
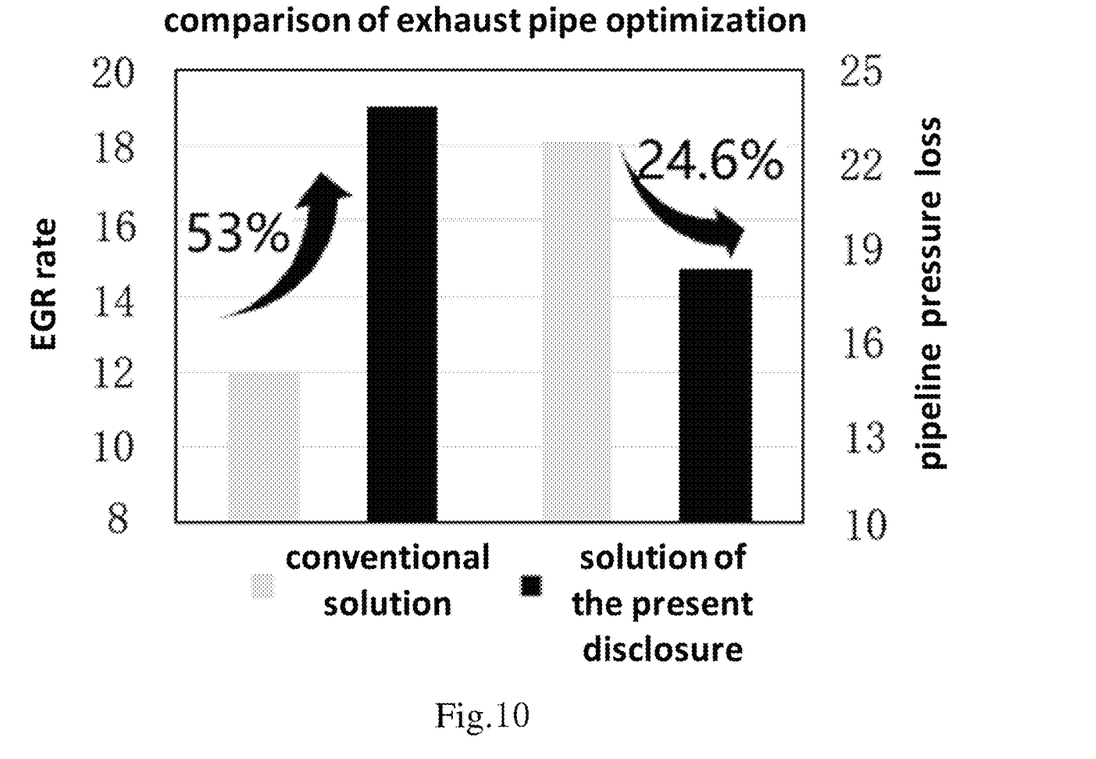
FIG. 10 is a schematic diagram showing the comparison between the exhaust pipe shown in the embodiment of the present disclosure and the existing exhaust pipe.

Compared to traditional solutions, the exhaust pipe 10 described in the present disclosure has a better practical effect in use. As shown in FIG. 9, by comparing the usage conditions of the exhaust pipe 10 before and after optimization, it can be seen that the EGR rate of the exhaust pipe 10 has increased by 53%, while the pipeline pressure loss has decreased by 24.6%.

This embodiment also relates to an engine, which includes the exhaust pipe 10 described above.

For the specific arrangement of the exhaust pipe 10 in the engine of this embodiment, reference can be made to the above description. By providing the exhaust pipe 10 described above, the engine of this embodiment can not only guide the gas in the exhaust pipe 10 well and reduce the mutual interference between the exhaust gas of each cylinder, but also increase the flow velocity of gas in the exhaust pipe 10 and increase the utilization rate of exhaust pulses. At the same time, it can also make the gas extraction of EGR smoother and help to make the allocation of pre-turbine flow rate and EGR rate more reasonable. In addition, the structure of the exhaust pipe 10 is simple and easy to adjust, making it more suitable for adjusting the requirements for EGR rate and pre-turbine flow rate according to different models.

Described above are only preferred specific embodiments of the present disclosure, but the scope of protection of the present disclosure is not limited to this. Any changes or replacements that can be easily conceived by those skilled in the art within the technical scope disclosed by the present disclosure should be covered within the scope of protection of the present disclosure. Therefore, the scope of protection of the present disclosure should be accorded with the scope of protection of the claims.

The invention claimed is:

1. An exhaust pipe, comprising:
   a first exhaust pipeline, which is arranged in a first direction;
   an EGR pipeline, which is arranged in a second direction, and an input end of which is communicated with an output end of the first exhaust pipeline, an included angle $\theta_1$ between the first direction and the second direction being smaller than 60°;
   a pre-turbine pipeline, wherein the pre-turbine pipeline, the EGR pipeline and the first exhaust pipeline are located in a first plane, and the pre-turbine pipeline is arranged in a third direction; the pre-turbine pipeline is communicated with a middle part of the EGR pipeline, an included angle $\theta_2$ between the third direction and the second direction is smaller than or equal to 90°, and a cross-sectional diameter D of the pre-turbine pipeline is 0.2-1 times a diameter of the first exhaust pipeline; and
   multiple second exhaust pipelines, output ends of the multiple second exhaust pipelines being all communicated with the pre-turbine pipeline.

2. The exhaust pipe according to claim 1, wherein the exhaust pipe further comprises:
   a transmission pipeline, wherein all the second exhaust pipelines are communicated with the transmission pipeline, an output end of the transmission pipeline is communicated with the pre-turbine pipeline, and a connection between the transmission pipeline and the pre-turbine pipeline is transitioned using a circular arc.

3. The exhaust pipe according to claim 2, wherein a value of a radius R of the circular arc is in a range of 10 mm≤R≤50 mm.

4. The exhaust pipe according to claim 2, wherein all the second exhaust pipelines and the first exhaust pipeline are arranged side by side in a fourth direction, and the fourth direction is perpendicular to the first plane.

5. The exhaust pipe according to claim 4, wherein all connections between the second exhaust pipelines and the transmission pipeline are transitioned using circular arcs.

6. The exhaust pipe according to claim 5, wherein all the second exhaust pipelines are arranged adjacent to each other, and output ends of all the second exhaust pipelines are communicated with each other.

7. An engine, comprising the exhaust pipe according to claim 1.

* * * * *